United States Patent
Keaton et al.

(10) Patent No.: US 7,636,455 B2
(45) Date of Patent: Dec. 22, 2009

(54) DIGITAL IMAGE EDGE DETECTION AND ROAD NETWORK TRACKING METHOD AND SYSTEM

(75) Inventors: Patricia A. Keaton, Woodland Hills, CA (US); Qin Jiang, Woodland Hills, CA (US); Fatih Porikli, New Providence, NJ (US)

(73) Assignee: Raytheon Company, Waltham, MA (US)

( * ) Notice: Subject to any disclaimer, the term of this patent is extended or adjusted under 35 U.S.C. 154(b) by 544 days.

(21) Appl. No.: 10/161,778

(22) Filed: Jun. 4, 2002

(65) Prior Publication Data

US 2003/0223615 A1 Dec. 4, 2003

(51) Int. Cl.
*G06K 9/00* (2006.01)
*G05D 1/00* (2006.01)
*H04N 7/00* (2006.01)

(52) U.S. Cl. .................. 382/104; 382/190; 701/28; 348/118

(58) Field of Classification Search ............. 382/100, 382/130, 108, 173, 156–159, 180, 181, 190, 382/195, 197, 199, 286
See application file for complete search history.

(56) References Cited

U.S. PATENT DOCUMENTS

| | | | | |
|---|---|---|---|---|
| 6,141,619 | A * | 10/2000 | Sekine | 701/93 |
| 6,466,684 | B1 * | 10/2002 | Sasaki et al. | 382/104 |
| 6,683,969 | B1 * | 1/2004 | Nishigaki et al. | 382/104 |
| 6,807,287 | B1 * | 10/2004 | Hermans | 382/104 |
| 2002/0031242 | A1 * | 3/2002 | Yasui et al. | 382/104 |
| 2006/0149780 | A1 * | 7/2006 | Joshi | 707/102 |

OTHER PUBLICATIONS

Steger, C.: 'An Unbiased Detector of Curvilinear Structures', IEEE Transactions on Pattern Analysis and Machine Intelligence, vol. 20, No. 2, Feb. 1998, pp. 113-125.

Proikli, F., et al.: 'An Unsupervised Road Extraction Algorithm for Very Low-Resolution Satellite Imagery', Proceedings of 1st Intern. Workshop on Pattern Recognition in Remote Sensing (PRRS), Technical Committee 7 (TC7) of the Recognition (IAPE), ISNG 1 901725 12X, Sep. 1, 2000, XP002255081 Andorra cited in the Application throughout.

McKeown Jr., D. M., et al.: 'Cooperative Methods for Road Tacking in Aerial Imagery', Carnegie-Mellon University—Digital Mapping Laboratory Department of Computer Science, Pittsburgh, PA 15213, 1988 IEEE, pp. 662-672.

(Continued)

*Primary Examiner*—Charles Kim
(74) *Attorney, Agent, or Firm*—Leonard A. Alkov

(57) ABSTRACT

A system and method for finding edge orientation and magnitude, and extracting a road path from an image. An image is segmented into at least a first window and a second window. A first road segment having plural parameters within the first window is specified. Plural road segments are identified, each having plural parameters, in the second window. The orientation of plural line segments in the second window are determined, and paired, based on their orientation. The line segment orientations are determined by receiving a plurality of edge orientation estimates, transforming a portion of them, and aggregating the transformed portion into an edge orientation estimate. A stochastic process is performed on the plural parameters of the plural road segments to identify a second road segment having the maximum correlation with the plural parameters of the first road segment.

49 Claims, 4 Drawing Sheets

OTHER PUBLICATIONS

Barzohar, M., et al.: 'Automatic Finding of Main Roads in Aerial Images by Using Geometric-Stochastic Models and Estimation', IEEE Transactions on Pattern Analysis and Machine Intelligence, vol. 18, No. 7, Jul. 1996, pp. 707-720.

Nevatia, R., et al.: 'Linear Feature Extraction and Description', University of Southern California, Los Angeles, CA 90007—Computer Science Department and Image Processing Institute, Computer Graphics and Image Processing 13, pp. 257-269, 1980.

Groch, W.-D.; 'Extraction of Line Shaped Objects from Aerial Images Using a Special Operator to Analyze the Profiles of Functions', Research Institute for Information Processing and Pattern Recognition, FIM, Breslauer Str. 48, D-7500 Karlsruhe 1, West Germany, Computer Graphics and Image Processing 18, pp. 347-358, 1982.

Fischler, M.A., et al.: 'Detection of Roads and Linear Structures in Low-Resolution Aerial Imagery Using a Multisource Knowledge Integration Technique', Artificial Intelligence Center, Computer Science and Technology Division, SRI Int'l, 333 Ravenswood Avenue, Menlo Park, CA 94025, Computer Graphics and Image Processing 15, pp. 201-223, 1981.

Tupin, F., et al.: 'Detection of Linear Features in SAR Images: Application to Road Network Extraction', IEEE Transactions on Geoscience and Remote Sensing, vol. 36, No. 2, Mar. 1998, pp. 434-453.

Trinder, J. C., et al.: 'Automatic Rod Extraction from Aerial Images', The University of New South Wales, School of Geomatic Engineering, Sydney, New South Wales 2052, Australia, Digital Signal Processing 8, Article No. SP980322, pp. 215-224, 1998.

Jang, B.-K., et al.: 'Analysis of thinning Algorithms Using Mathematical Morphology', IEEE Transactions on Pattern Analysis and Machine Intelligence, vol. 12, No. 6. Jun. 1990, pp. 113-125.

Vanderbrug, G. J.: 'Line Detection in Satellite Imagery', IEEE Transactions on Geoscience Electronics, vol. GE-14, No. 1, Jan. 1976, pp. 37-44.

\* cited by examiner

DIGITAL IMAGE EDGE DETECTION AND ROAD NETWORK TRACKING METHOD AND SYSTEM

BACKGROUND OF THE INVENTION

1. Field of the Invention

The present invention relates to digital image analysis and mapping. More specifically, the present invention relates to edge detection and road network tracking in aerial digital images.

2. Description of the Related Art

Aerial images are produced by cameras located in aircraft or other flying machines and from orbiting satellites. Such cameras are typically pointed downward and are used to capture images of the Earth's surface. While photosensitive film and chemical processing have been employed to capture images in the past, modern aerial imaging systems typically employ digital imaging sensors that output digital image files. The digital image files produced by digital imaging sensors can be transmitted by radio communications or through transportation of digital data storage media. The file structure typically includes a plurality of pixels that are located in two dimensions and that comprise data reflecting the electromagnetic energy detected at each particular pixel location. In typical applications, the aerial image files are used to analyze Earth surface characteristics, both natural and man-made.

In the past, most aerial imaging systems were sensitive in the panchromatic, visible, spectrum. Modem imaging sensors have been deployed that are sensitive in the near infrared band, and that are monochromatic in certain narrow bands such as the green or red bands. Certain imaging sensors are sensitive in plural bands. In the case where an imaging sensor is sensitive in a single band, then the digital image file comprises a single data field indicating the magnitude of the energy in that band for each pixel in the file. In the case where a sensor is sensitive in plural bands, then each pixel comprises a vector with data indicating the magnitude of energy in each of the plural bands of sensitivity.

Regarding the use and application of the imaging data gathered by aerial imaging systems, the applications are many and varied. Some applications are mapping, topography, or weather related. Some are directed to industrial characteristics, natural resource management and trends over time. Of course, some applications involve the military and strategic interests of nations. One particular application is the mapping of roads. While human analysis has been employed to map roads from aerial images, the modern trend has been toward automated road mapping, thus greatly expediting and lowering the cost of the process of road detection and mapping from aerial image files. Automated road mapping has been comprised of two general steps. First is analyzing plural subsets of the pixels in a given image to identify certain characteristics of each subset that are consistent with those expected from a road structure. Second, is an analytical process of tracking road characteristics across pixel subsets to identify the path of a roadway through the image.

Of course, those skilled in the art appreciate that roadway mapping is analogous to structural mapping of a variety of other items in digital imagery. More generally stated, accurate edge and line (hereinafter referred to generically as "edge" or "edges") orientation is important in cartographic applications, road extraction from aerial imagery, medical image processing, techniques for grouping labeled pixels into arcs and then segmenting the arcs into line segments, edge linking and other tasks requiring curvilinear features such as fingerprint processing, and others.

The characteristic that has typically been extracted from a road structure image in the prior art has been the detection of an edge or line in the pixel field. Essentially, a subset of pixels are analyzed to detect contrast changes, which are changes in adjacent pixel magnitudes, and, a direction of the edge or line is extracted. The direction, or orientation, has been determined using a compass type directional filter. A compass filter may be an implementation of a finite impulse response filter in a digital signal processor that outputs a filter response for each feasible orientation, given the pixel map of the given pixel subset. Pixel maps applied in the prior art have typically been three-by-three pixel areas or five-by-five pixel areas. Given a three-by-three pixel map, the feasible orientations are zero, $\pi/4$, $\pi/2$, $3\pi/4$, and $\pi$ radians. Of course, the orientations ranging from $\pi$ to $2\pi$ radians mirror those in the 0 to $\pi$ radian range. Typical methods used to compute the orientation value for a compass type of directional filter set are presented in R. Haralick and L. Shapiro, Computer and robot vision; Vol. 1, *Addison-Wesley*, 1992, and, A. Jain, Fundamentals of digital image processing, *Prentice-Hall*, 1989. Orientation estimates obtained by using compass type directional filters are inherently inaccurate, due to the quantization of the orientation values into ranges specified by the pixel map size and number of directional filter responses employed.

As noted above, modern aerial imaging systems provide multi-spectral output vectors for each pixel. Analysis of such data requires edge/line analysis for each band and a fusing of the processed data to determine the net edge/line magnitude and orientation. The prior art methods of doing this do not handle the multi-spectral images, or require segmentation-based highly complex operations in order to calculate line/edge strengths.

Despite the number of different approaches that have been proposed for edge and line detection, the accurate estimation of the edge orientation has only been marginally investigated. Most methods such as derivative approaches using linear filtering, mathematical morphology, Markov fields, and surface models, concentrate only on the accurate localization of the edge and its immunity to noise, but not the precise estimation of the edge orientation. Part of the problem with the prior art is that it was designed for a single energy band image. When plural energy bands of data are available, the prior art merely fuses the estimates from each band with an arithmetic averaging process.

Having extracted the edge/line magnitude orientation from plural pixel maps, the second operation in roadway mapping process is to track the edge through the plural image subsections to produce a useful map of the road path. Most prior art algorithms for extraction of road networks are based on edge linking and template matching techniques. Such techniques are described in "An Unbiased Detector of Curvilinear Structures" by C. Steger, *IEEE Trans. on Pattern Analysis and Machine Intelligence*, vol. PAMI-20, no. 2, pp. 113-125, 1998; "An Unsupervised Road Extraction Algorithm for Very Low-Resolution Satellite Imagery" by F. Porikli and T. Keaton, $1^{st}$ *Intl. Workshop on Pattern Recognition in Remote Sensing(PRRS)*, Andorra, Andorra, 2000, and "Cooperative Methods for Road Tracking in Aerial Imagery" by D. M. McKeown and L. Cooper, in *Proc. IEEE Computer Vision and Pattern Recognition(CVPR)*, pp. 662-672, 1988. These techniques were mainly developed to deal with low-resolution imagery. However, the latest generation of satellites provide high resolution imaging that has about twenty to thirty times the resolving power. With higher resolution data, there are new challenges, such as shadows across the roadway, trees on a road edge, cars, so it is more complex.

The prior art primarily used a Markov (chain to model intensity values of pixels along a roadway. Also, the prior art Markov chain did not adapt well to changes in road surface color intensity (asphalt to concrete, etc.). Although some prior art techniques that have been developed to extract road networks from aerial imagery may be modified to deal with high resolution satellite imagery, the road networks present in high resolution satellite images are much more complex. This has created an environment where the prior art algorithms are unable to extract all the useful information available in the higher resolution imagery.

As mentioned above, high-resolution imagery road networks present more details on the roads such as lane markings, vehicles, shadows cast by buildings and trees, overpasses and changes in surface material, which make the extraction of road networks a much more complicated problem. As a result, most existing algorithms are not suitable to process high-resolution imagery. In addition, most existing algorithms are deterministic and model-free techniques, which is another reason why they can't handle the variations of road networks presented in high resolution-imagery.

In "Automatic Finding of Main Roads in Aerial Images by Using Geometric-Stochastic Models and Estimation", by M. Barzohar and B. Cooper, *IEEE Trans. on Pattern Analysis and Machine Intelligence*, vol. 18, no. 7, pp. 707-721, 1996, Barzohar and Cooper proposed a geometric-stochastic model of roads for finding main road networks, but this model is not optimal for two reasons. First, the model was developed to model roads in low-resolution imagery, hence it focused on modeling road edges using intensity variations. Second, the model was developed for road finding using dynamic programming. In order to apply dynamic programming in road finding, some unpractical assumptions have to be imposed into the model.

The extraction of road networks from high resolution satellite images requires a very different methodology from that used to extract roads from low resolution satellite images. In low resolution satellite images, the width of roads typically ranges from one pixel to five pixels and extraction of road networks is equivalent to detection of lines or detection of linear structures. However, with high-resolution images, the road-width can very considerably and additional variations are present such as lane markings, vehicles, shadows cast by buildings and trees, overpasses and changes in surface material. These variations make the extraction of road networks a much more complicated problem.

Thus there is a need in the art for a system and method for line and edge detection and structural detail mapping in digital imagery.

SUMMARY OF THE INVENTION

The need in the art is addressed by the systems and methods of the present invention. The inventive system determines edge orientations in an image and employs the edges to extract a road path. The system receives a plurality of edge orientation estimates and transforms a portion of the plurality of edge estimates, then aggregates the transformed portion of the plurality of edge estimates to yield more accurate edge orientations used to define road segments. The image is segmented into at least a first window and a second window. The system specifies a first road segment having plural parameters within the first window, then identifies plural road segments, each having plural parameters, in the second window. Then, the system performs a stochastic process on the plural parameters of the plural road segments to identify a second road segment having the maximum correlation with the plural parameters of the first road segment.

In a specific embodiment, the image is a color image or a multi-spectral image. In another embodiment, the edge orientation estimates are received from a plurality of directional filters, a plurality of compass filters, a plurality of channels, or plural outputs of a finite impulse response filter. The transformation process may utilize a line to vector transform. The transformation process may also map the plurality of edge estimates from the 1-½D to the 2D domains. In another embodiment, the system further receives a magnitude associated with each edge orientation estimate and the transforming step operates to convert scalar edge orientation and magnitude values to vectors. In another embodiment, the aggregation process comprises the step of fusing the transformed portions of the plurality of edge estimates. The aggregation process may apply a fusing algorithm to aggregate the transformed portions of the plurality of edge estimates. The aggregation process may fuse the plurality of transformed portions of the plurality of edge estimates using linear operations.

In a specific embodiment, the image segmenting process is accomplished by selecting groups of adjacent pixels in a digital image. The first window and the second window may be adjacent to one another. In another specific embodiment, the first road segment is specified by manual user intervention. Or, the first road segment may be specified automatically by a computer. In another embodiment, the identifying step further comprises the steps of determining the orientation of plural line segments in the second window and pairing the plural line segments based on a their orientation. In a refined embodiment, the determining step further comprises the steps of receiving a plurality of edge orientation estimates and transforming a portion of the plurality of edge estimates. Then, aggregating the transformed portion of the plurality of edge estimates.

In a specific embodiment, the plural parameters are comprised of road width, road orientation, road intensity, or road color. The stochastic process may include probabilistic modeling, in particular, a Markovian process to maximize the joint probability of the parameters. Also, the parameters may be processed in the stochastic process as random variables to maximize the joint probability of the parameters. In another embodiment, the system connects the first road segment and the second road segment into a road path. The systems may also employ a non-linear filter to reduce road path estimation errors.

DESCRIPTION OF THE INVENTION

Figure 1:
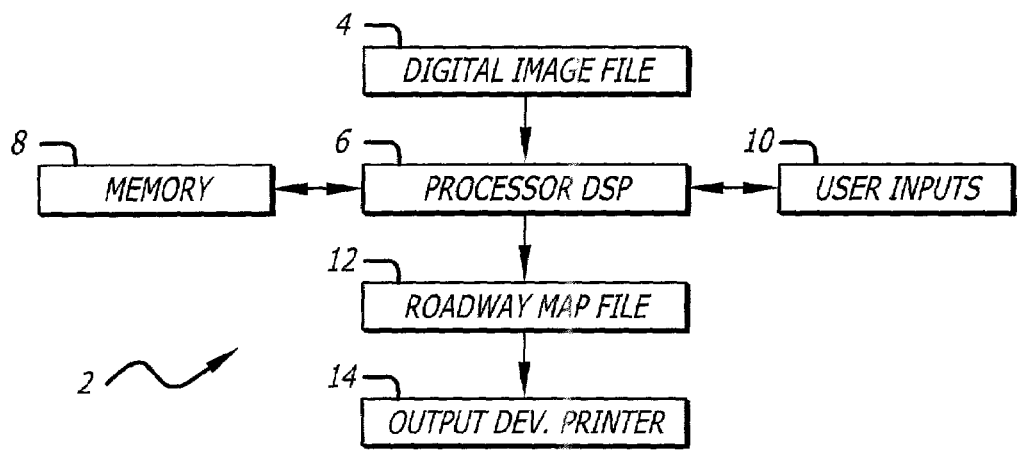
FIG. 1 is a functional block diagram of an image processing system according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention teaches a system and method that improves the accuracy of orientation estimates of various directional edge and line (hereinafter referred to generically as "edge" or "edges") detectors used in image analysis applications, and, applies the edge detection information to a road path tracking process. The present invention also teaches an improved system and method for extracting roads from high-resolution imagery in an automated fashion. In an illustrative embodiment, it is demonstrated that the teachings of the present invention are particularly suitable for multi-color and multi-spectral images.

The edge detection related teachings of the present invention utilize a novel mapping that converts scalar edge strength values to vectors, aggregates the converted values into a single vector, and then determines a resultant orientation value from that single vector. Accurate edge orientation is important in cartographic applications, road extraction from aerial imagery, medical image processing, techniques for grouping labeled pixels into arcs and then segmenting the arcs into line segments, edge linking and other tasks requiring curvilinear features such as fingerprint processing, and so forth. Those skilled in the art will appreciate the broad utility and many applications for the edge detection system and method taught herein.

Respecting the task of modeling roads and road tracking techniques, the present invention teaches the modeling of a road path as a stochastic process. More particularly, a probabilistic process is employed where the road path is segmented and each individual road segment is represented by a set of Gaussian random variables. The variables represent certain parameters that are used to model road width, orientation, intensity variations, and other parameters. Based on this model, a road tracking technique is developed that computes parameters of each road segment by maximizing the joint probability of a road path.

As noted herein before, the prior art has obtained edge orientation estimates by employing compass type directional filters. Such filters have an inherent inaccuracy because they quantize the orientation values into ranges, defined by the number of directional filters (the number of directions) used. Thus, the estimation error of a prior art directional multi-filter set has a saw-tooth form, and is much higher than the error incurred when using simple matched two-filter pairs. By applying the teachings of the present invention, a more accurate orientation estimate is realized, which is more robust in the presence of noise than prior art approaches. Stated generally, the present invention minimizes the inherent orientation error of the prior art compass type directional filters by using a correlation between plural filter responses in a set.

Respecting the prior art road extraction processes, most applied algorithms are based on edge linking and template matching techniques. They have been primarily applied to low-resolution imagery. The state of the art has advanced, and now much higher resolution imagery is presented for analysis. In high-resolution imagery, however, road networks present more details on the roads such as lane markings, vehicles, shadows cast by buildings and trees, overpasses and changes in surface material, which make the extraction of road networks a much more complicated problem. As a result, most prior art algorithms are not suitable to process high-resolution imagery. In addition, most existing algorithms are deterministic and model-free techniques, which is one reason why they do not handle the variations of road networks presented in high resolution-imagery. The stochastic process taught by the present invention to represent and model road parameters is much more useful to deal with the variations in road images when processing an algorithm for road network extraction. The extraction of road network based on a stochastic road model is more robust in the presence of noises and variations on a road network.

In an illustrative embodiment of the present invention, a transform that improves the accuracy of computing the orientation of edges detected by compass type finite-impulse-response filters as well as by other directional filters is presented. A novel line-to-vector transform (hereinafter "LVT") is applied to achieve the increase in accuracy. The LVT is a one-to-one mapping from a 1-½D data domain onto a 2-D vector domain, which is designed to evaluate the accordance of the outputs from multiple detectors, such as those tuned to find edges and lines. After the filtered responses are converted to vectors, linear mathematical operations are applied in the transform domain to yield an accurate estimate of the edge orientation, as well as a measure of the local coherence. By employing, the LVT transform, it is possible to fuse multi-channel image features provided that the channels establish a phase relationship. A comparison of the orientation (estimation performance of several standard and compass type edge detectors has demonstrated that the application of the LVT results in a more precise orientation estimate, and is much more robust in the presence of noise.

Having segmented an image, and having defined a plurality of edges therein, a model-based algorithm extracts major road networks therefrom. In an illustrative embodiment, a high resolution satellite image such as imagery captured by the new IKONOS satellite is processed. A road path is modeled as a sequence of road segments along with two sets of model parameters that are used to represent the geometric characteristics and intensity values of the road segments. The model parameters are treated as random variables. The present road tracking system initially computes all possible lines segments within a local window, or image segment, and then pairs them based on their model parameters. A new connected road segment is then determined from all paired line segments by estimating the distribution of the road segments, and maximizing the probability of the selected road segments. Finally, a nonlinear filtering operation is applied to the resulting road path to remove any estimation errors and to smooth the road boundaries.

Reference is directed to FIG. 1, which is a functional block diagram of an image processing system 2 according to an illustrative embodiment of the present invention. A digital image file 4 is input to a processor 6 and may be temporarily stored in a memory 8, which is coupled to the processor 6. The image file 4 is comprised of a plurality of pixels that are located in two dimensions and are each defined by a vector of intensity values, one value for each spectra present in the image. For example, a color image may include pixels, each having a three-dimension intensity vector for the red, blue, and green spectra. The memory 8 is also used to store executable software, variables, and data structures that are employed to embody the systems and methods taught by the present invention. The processor 6 in an illustrative embodiment is a digital signal processor, which is particularly useful in implementing digital filters, transforms, computing probabilistic functions, and other uses, as are appreciated by those skilled in the art. A user interface 10 that allows user inputs to the processor 6 is provided. In an illustrative embodiment, the user input 10 is a kernel of information indicating a particular segment of an image and a road path orientation. This kernel of information is used to initiate the road tracking system and method taught by the present invention. The processor 6 performs the edge detection and road tracking functions taught by the present invention and then outputs a roadway map file 12. The roadway map file 12 can be communicated and used in a variety of fashions, as are understood by those skilled in the art. In an illustrative embodiment, the roadway map file 12 is output to a printer 14 and printed. The output device 14 can also be used for intermediate processor 6 outputs, such as outputting a segment of an image showing a plurality of edges detected in the edge detection process.

Figure 2:
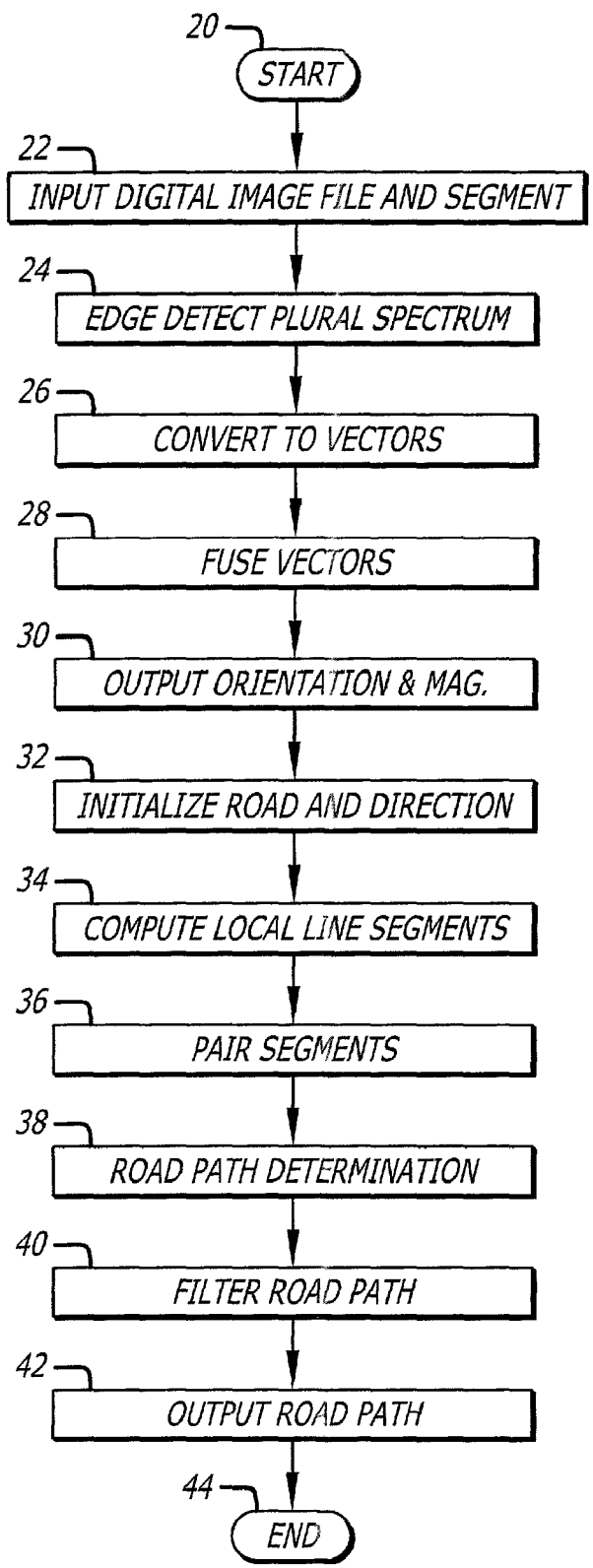
FIG. 2 is a flow diagram of an imaging processing and road mapping system according to an illustrative embodiment of the present invention.

Reference is directed to FIG. 2, which is a flow diagram of an imaging processing and road mapping system according to an illustrative embodiment of the present invention. The process starts at step 20 and proceeds to step 22 where a digital image file is input to the system and is segmented according to the design of the processing system, which will be more fully discussed hereinafter. At step 24, an edge detection process is performed in the plural spectra that are present in the image. For example, in a color image, edge detection estimation may occur in the red, blue, and green spectra. The plural edge estimates are converted to vectors at step 26, which is accomplished using a LVT in the illustrative embodiment. At step 28, the vectors are fused, which can be accomplished using several mathematical approaches that will be more fully described hereinafter. The fused vector is output as a higher confidence edge orientation and magnitude at step 30. There may be plural edges detected in any given image segment, or image window. In addition, the edge detection process is repeated for the plural image segments defined by the system design.

Having output the edge orientations and magnitudes at step 30, the process continues at step 32 where a road path is initialized. The initialization 32 includes both the selection of an edge, or edges, and a definition of the orientation. Thus, step 32 initializes a road for the subsequent roadway tracking process. Initialization can occur manually when a user studies the input image and recognizes a roadway, or can be accomplished automatically by computer analysis. At step 34, the process computes all the line segments (edges) in the local image window. This is accomplished by repeating steps 24 through 30 above for as many edges as are present in the image segment. At step 36, the line segments are paired, depending on their orientation and spacing, which indicates parallelism commonly present in road segments. A road path determination process, to be more fully described hereinafter, occurs at step 38. Step 38 is accomplished by comparing potential road path edge pairs from image segment to image segment within the process. A stochastic process is employed to maximize the likelihood that a present road segment continues a previous road segment. Thus, a road path is defined in an iterative process as the various image segments are processed. The road path is filtered at step 40 and is ultimately output at step 42. The process then ends at step 44.

The issue of accurate image edge orientation determination is now considered. Despite a number of different approaches taught in the prior art, highly accurate estimation of the edge orientations has only been marginally investigated. Most prior art attempts, such as derivative approaches using linear filtering, mathematical morphology, Markov fields, and surface models, concentrated only on the accurate localization of the edge and its immunity to noise, but, not the precise estimation of the edge orientation. In an illustrative embodiment, the present invention teaches a system and method for fusing the outputs of directional linear compass filters, which stands in contrast to the prior art edge and line detectors.

An edge is defined as a place in an image where brightness value, or intensity, varies dramatically. The detection of an edge requires a filter operation whose output emphasizes the changes in intensity and suppresses constant intensity valued regions. Spatial derivative operators are suitable for such an operation. Depending on the direction of the derivatives, a first partial derivative may be characterized by backward, forward, symmetric, and boxed differences that are approximated as filter templates. A gradient is computed from the first derivatives, usually taken along orthogonal directions. In general, the magnitude of the gradient is assumed to be the contrast of the detected edge. To determine the direction of the edge orientation, the angle is computed from a ratio of first derivatives from non-parallel filters.

When more than two directional filters are employed, as in compass filters, the orientation is typically chosen as the direction of the filter that gives the highest magnitude. Since this naturally requires that the range of edge orientation be uniformly quantized to the number of available filters, the correlation between each filter is disregarded and thus can generate a large error in the output orientation estimate. In addition, one cannot directly sum up and average plural orientation angles resulting from a single edge because of the ambiguity that exists at the limits of the angular spectrum $(0,\pi)$. For example, if two lines with orientation angles $(\pi-\epsilon)$ and $(\epsilon)$ lie in similar directions, then their averaged orientation angle is $(\pi/2)$, which is almost perpendicular to both lines. The averaging ambiguity can be handled by imposing a circularity criterion with respect to the orientation. However, an adequate conversion should not only consider the circular property of orientation, but also the inverse relationship between orthogonal filter outputs. The more closely an edge orientation is to the orthogonal direction of the filter, the lower its response should be. Thus, if an edge results in equal magnitudes on a perpendicular filter pair, then it is similar to neither of them. Likewise, an edge Should not have maximum magnitude response at the same time on an orthogonal filler pair. In order to combine both desired properties, the present invention teaches the use of a LVT to represent the detection from orthogonal filter pairs as vectors with inverse responses such that their effects cancel, and, vector addition can be applied to generate the correct orientation.

The simplest gradient detectors, which utilize no a priori information about the nature of the image, are matched orthogonal filters. At an image point, let the magnitude of the responses to orthogonal filters be $|T_x|=t_x$ and $|T_y|=t_y$. Then, the edge contrast $\alpha$ is expressed in terms of the length of the gradient vector $\vec{g}=[t_x, t_y]^t$ as:

$$\alpha = \|\vec{g}\| = \sqrt{t_x^2 + t_y^2} \quad (1)$$

The edge contrast can also be approximated as $\alpha=\|\vec{g}\|=|t_x|=|t_y|$. The orientation of the edge is calculated according to the magnitudes of the spatial derivatives as:

$$\theta = \arctan\left(\frac{I_y}{I_x}\right) \quad (2)$$

The most popular matched template pairs were proposed by Roberts, Sobel, Prewitt, Frei. Haralick showed that the noise model of the image intensity determines the best choice of edge operator.

In the case of using more than two templates that are oriented in different directions, like compass filters, the edge contrast is usually assigned to the maximum of the filter magnitudes. Thus, the edge orientation is considered to be the direction of the filter producing the maximum response as:

$$\alpha = \max_{n=0,\ldots,N-1} t_n \text{ and } \theta = \theta_{argmax} t_n \quad (3)$$

where N is the total number of compass filters and $t_n$ is the magnitude response of the $n^{th}$ filter.

The line to vector transform ("LVT") applied in an illustrative embodiment of the present invention is a mapping from a 1½-D direction domain to a 2-D vector domain in such a way that perpendicular edge contrast becomes reciprocal to each other. As an edge orientation becomes more similar to the direction of a filter, the filter response to the perpendicular filter will attenuate. This property is employed to determine the precise orientation of edges that lie between compass filters rather than just selecting the direction of the filter generating the maximum response. Therefore, the orientation estimate is more accurate and the aforementioned gradient response limitations are eliminated. If the filter directions are represented such that their responses to perpendicular filters cancel, then all the filter responses can be fused in order to generate a reliable orientation estimate. The illustrative embodiment imposes the circularity property by extending the angular spectrum from $(0,\pi)$ to $(0,2\pi)$ such that the responses become:

$$t_n(\theta_n) \rightarrow \vec{t}_n(\omega_n) = t_n e^{j2\theta_n} \quad (4)$$

where $\omega_n = 2\theta_n$, $t_n$ is the magnitude response for the $n^{th}$ directional template.

The responses of perpendicular filter pairs are subtracted while aggregating nonparallel responses using vector addition, as:

$$\vec{t} = \sum_{n=0}^{N-1} \vec{t}_n(\omega_n). \quad (5)$$

The resulting phase is then converted back to a line orientation estimate by dividing by two.

Figure 3:
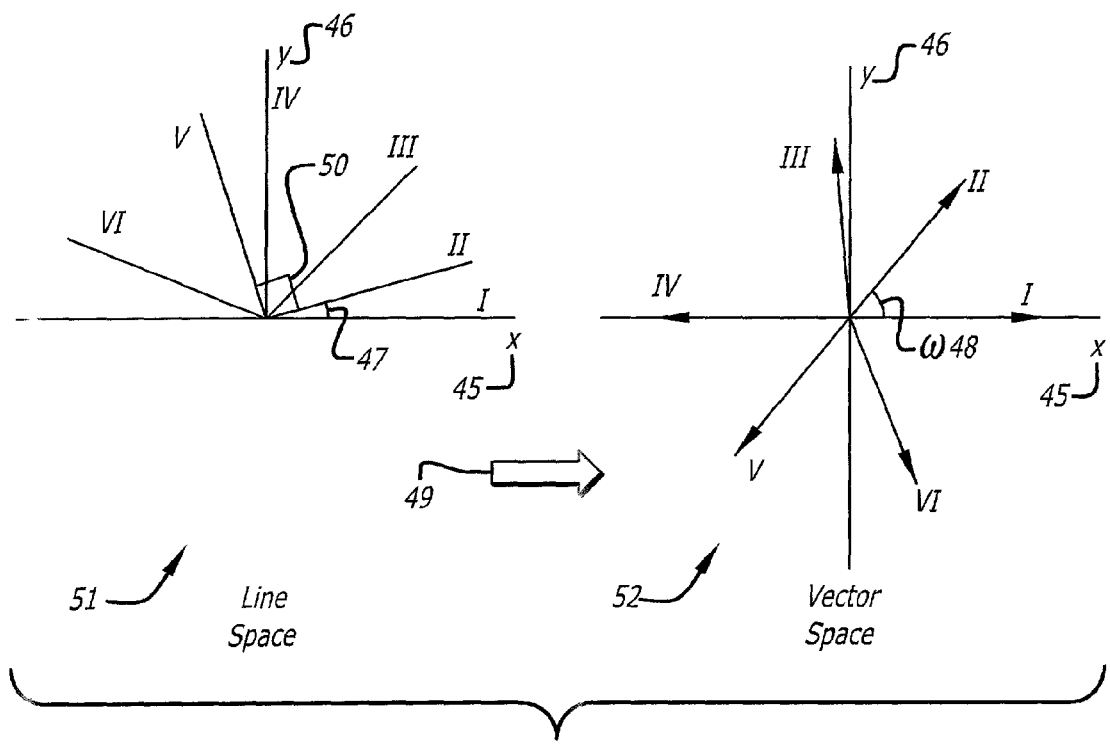
FIG. 3 is a diagram of the line to vector transform according to an illustrative embodiment of the present invention.

Reference is directed to FIG. 3, which is a diagram of the line to vector transform discussed above. The 1-½ D LINE domain 51 and 2D Vector domain 52 are illustrated in a rectangular coordinate system having a 'X' and 'Y' axis. The positive 'X' axis 45 is defined as 0 radians, the positive 'Y' axis 46 as $\pi/2$ radians, the negative 'X' axis as $\pi$ radians, and the negative 'Y' axis as $4\pi/3$ radians. A plurality of lines identified by Roman numerals I, II, III, IV, V, and VI identify each line in the LINE domain 51 in this hypothetical. The angle θ 47 is illustrated respecting line II. Note that lines II and V are orthogonal to one another, indicated by the right angle 50. The transform 49 is applied, and is consistent with Equation (4), above. The resultant VECTOR domain 52 plot illustrates the conversion to the 2D vector domain. Note that plural vectors are illustrated, identified by Roman numerals I, II, III, IV, V, and VI, which correspond to the aforementioned lines references. Angle ω 48 is illustrated, again with respect to vector II. Note that Vectors II and V are not orthogonal.

Although the foregoing representation enables the combination of as many directional filters as possible, it should be noted that the directions of filters can not be selected at random. To clarify this point, let $T_1, T_2, T_3, \ldots, T_N$ be filters having the directions $\theta_1, \theta_2, \theta_3, \ldots, \theta_N$, then without loss of generality, assume that the magnitude of their ideal edge responses is equal to unity. Let the edge have an angle $\phi$, and the response to each filter will be:

$$t_n(\theta_n) = \cos(|\theta_n - \phi|) = \cos(\theta_n - \phi). \quad (6)$$

When this response is represented as a vector, it becomes:

$$\vec{t}_n(\theta_n) = \cos(\theta_n - \phi) e^{j\theta_n} \quad (7)$$
$$= \frac{1}{2}(e^{j(\theta_n - \phi)} + e^{-j(\theta_n - \phi)}) e^{j\theta_n}$$
$$= \frac{1}{2}(e^{j(2\theta_n - \phi)} + e^{j\phi}).$$

The summation of filter responses is then:

$$\sum_{n=0}^{N-1} \vec{t}_n(\theta_n) = \sum_{n=0}^{N-1} \cos(\theta_n - \phi) e^{j\theta_n} \quad (8)$$
$$= \frac{N}{2} e^{j\theta_n} + \frac{1}{2} e^{-j\phi} \sum_{n=0}^{N-1} e^{j2\theta_n}.$$

Here, the magnitude of the sum of the filter responses will be independent from the edge orientation $\phi$, and it will have the same phase as the edge orientation. This condition is satisfied only when the second term cancels out, which occurs when the summation of exponential terms is zero, as:

$$\sum_{n=0}^{N-1} e^{j2\theta_n} = \sum_{n=0}^{N-1} e^{j\omega_n} = 0 \quad (9)$$

where $\omega_n = 2\theta_n$. This is why the LVT representation must double the orientation values.

One solution to the Equation (9) is to assign filter orientations as $$\theta_n = \frac{\pi}{N} n,$$

which yields the expression:

$$\theta_n = \frac{\pi}{N} n \Rightarrow \sum_{n=0}^{N-1} e^{j\frac{2\pi n}{N}} = 0 \quad (10)$$
$$\Rightarrow \sum_{n=0}^{N-1} e^{j\frac{2\pi n k}{N}} = 0$$

-continued $$\Rightarrow \delta[k]_{k=1} = 0.$$

where $0 \leq \theta < \pi$.

Therefore, if the angular spectrum $(0, \pi)$ is sampled regularly, then the total response will be unbiased and the resulting phase will be equal to the correct orientation of the edge. Note that for multiples of the four templates, another solution exists. If the first filter direction is $\beta$ then the second filter should be $$\frac{\pi}{2} - \beta$$

the third filter $$\frac{\pi}{2} + \beta,$$

and the fourth filter $\pi-\beta$ where $\beta$ is in the range of $(0,\pi/2)$. This filter set is comprised of reciprocal pairs in the LVT domain with respect to the origin. For just two templates the above equation will have no solution because $\theta$ can not be equal to both 0 and $\pi$. Therefore, LVT can only be used to fuse the responses from three or more templates.

The LVT also allows the filter responses from multi-spectral channels to be fused in a similar manner. Let M be the number of the multi-spectral band images, i.e. red, green, blue. If $\vec{t}_{m,n}$ is the LVT representation for the $n^{th}$ filter response from the $m^{th}$ image band, then the aggregated response is:

$$\vec{t}_{M,N} = \sum_{m=1}^{M} \sum_{n=0}^{N-1} \vec{t}_{m,n}. \qquad (11)$$

Thus, the LVT can be used to more accurately find the orientation of edges in a color image, or multi-spectral images, by fusing the responses of compass filters applied to the various bands within the same image such as the red, green, blue, or hue, saturation, or other bands.

Figure 4:
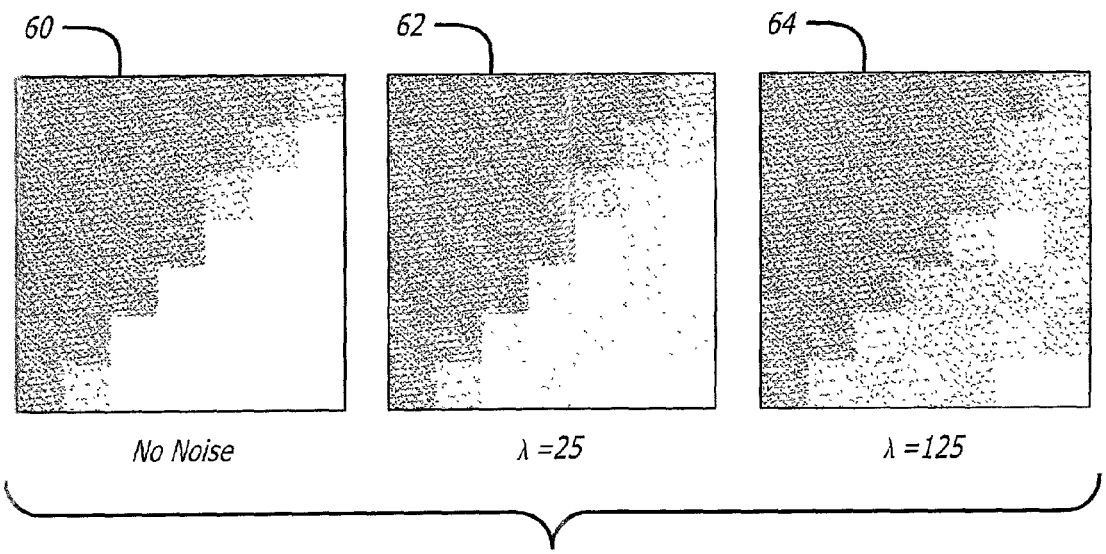
FIG. 4 is a section of an exemplary image showing the effects of noise on pixel detail processed in an illustrative embodiment of the present invention.

Tests were conducted to determine the orientation estimation accuracy of the illustrative embodiment. Sample image files having various noise factors were used in the test. Attention is director to FIG. 4, which illustrates three image file template masks used in the tests. First, an image 60 with an edge, and that has no noise present, was used. Subsequently, a zero-mean Gaussian noise:

$$n_r = \frac{\lambda}{\sqrt{2\pi}} e^{-r^2} \qquad (12)$$

was added to the input edge images in order to investigate the noise immunity of each operator. The values of $\lambda$ were specified as 25 and 125. FIG. 4, images 62 and 64 illustrate the effects of these noise factors, respectively. At each iteration the input image was corrupted by a Gaussian noise source.

The tests employed linear matched and compass edge detectors such as Roberts, Sobel, Prewitt, Frei, Netavia, Robinson, and an illustrative embodiment eight-filter compass detector. In order to determine the properties of these operators, the image files chosen (FIG. 4) each had a step edge model such that the edge passes through the center of the template mask. The intensity value of the pixel is calculated by a convex combination of the corresponding pixels lying on both sides of the dividing step edge.

Figure 5:
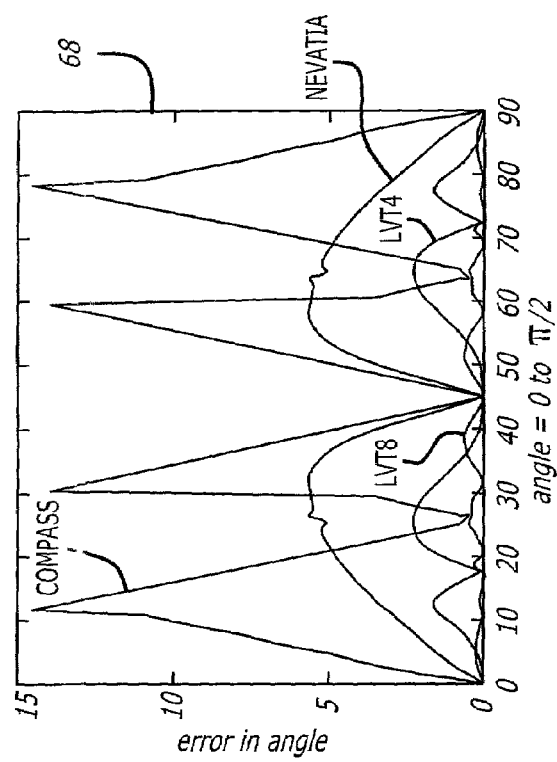
FIG. 5 illustrates orientation error diagrams produced in processes of an illustrative embodiment of the present invention.
Figure 5:
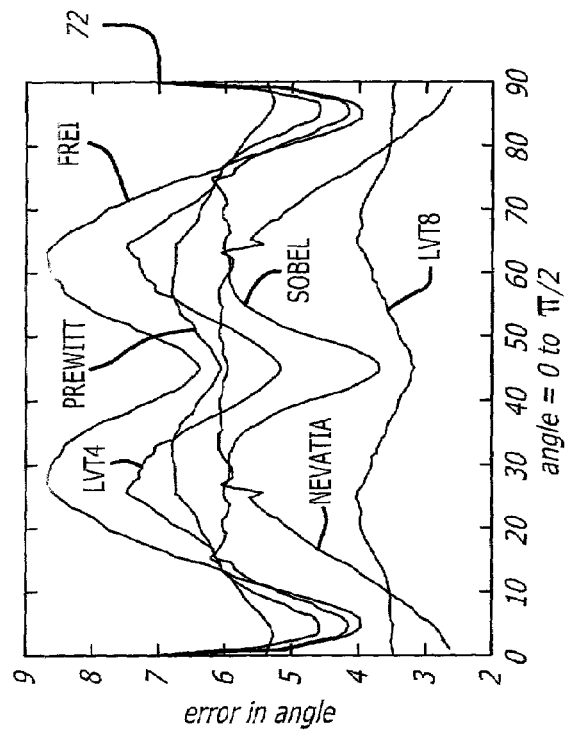
Figure 5:
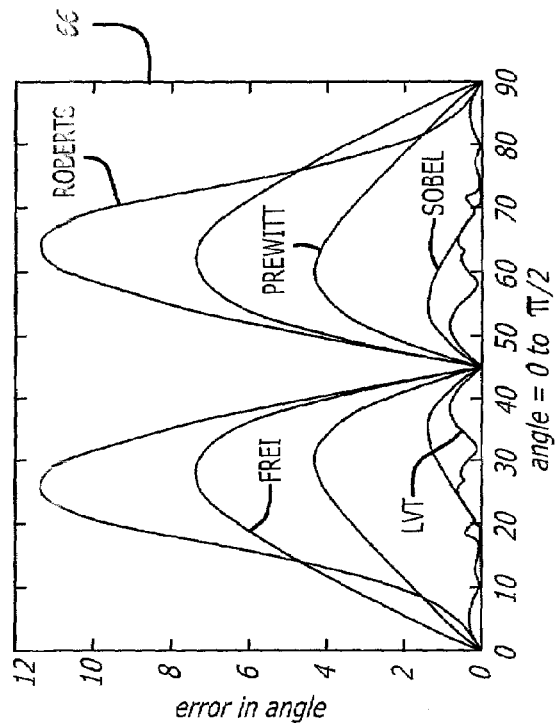
Figure 5:
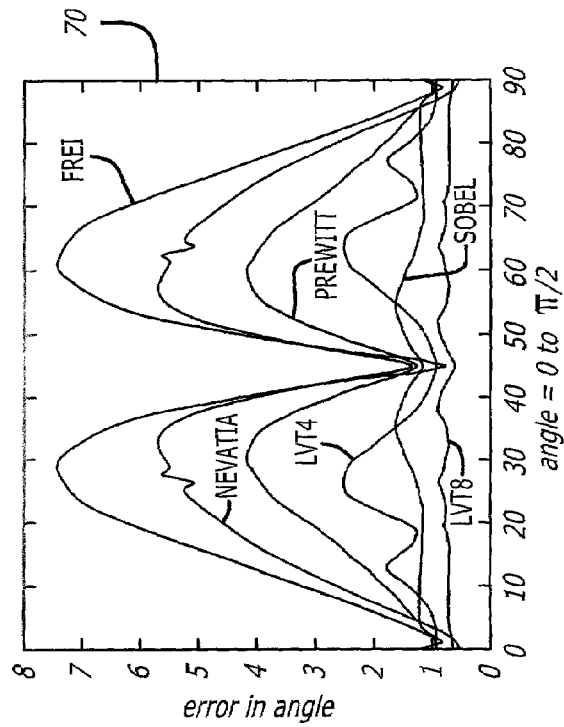

In FIG. 5, plot 66 shows the orientation error obtained for a set of linear filters and the 8-compass filters empowered by LVT of the present invention. Plot 68 summarizes the orientation errors found for the compass type filters. For each edge operator, the orientation over 10,000 different (edge images was estimated, and then the average error was computed. The values of the $\lambda$ indicate the amount of noise corruption from mild to extreme. The test result plots shown in FIG. 5 demonstrate that the LVT fused filters provide better estimates of edge orientation than any of the other matched linear or compass filters. In particular, FIG. 5, plot 66 illustrates the orientation errors for Roberts, Sobel, Frei, Prewitt and LVT compass-8 filters, plot 68 illustrates the orientation error for Nevatia, no-LVT compass-8, LVT compass-4 and compass-8 filters, plot 70 illustrates the average error for $\lambda=25$, and plot 72 for $\lambda=125$.

Tests were also performed using color, or multi-spectral images. For color imagery, three approaches for estimating edge orientation were investigated. The first method fuses the edge orientations from multiple bands by averaging their values. Let $\phi_R$, $\phi_G$, $\phi_B$ be the orientation values of the red, green and blue bands derived by Sobel operator, which was chosen due to its minimal estimation error characteristics among the methods other than the LVT. Then the orientation estimate can be found as $$\phi_1 = \frac{1}{3}(\phi_R + \phi_G + \phi_B). \qquad (13)$$

The test results indicated that this approach yields very erroneous orientation estimates. A second approach to extract a single edge orientation estimate from the three color image bands is to calculate the estimate by first blending the magnitude responses the color bands, and then computing the orientation. This is the same as using only the luminance (intensity channel) information to compute the edge orientation. Let the responses to the vertical and horizontal Sobel operator for each channel be specified by $d_R^X$, $d_R^Y$, $d_G^X$, $d_G^Y$, $d_B^X$, $d_B^Y$. Then the orientation estimate is given by:

$$\phi_2 = \tan^{-1}\left(\frac{d_R^Y + d_G^Y + d_B^Y}{d_R^X + d_G^X + d_B^X}\right). \qquad (14)$$

The tests indicated that the orientation estimates for the second method are also inaccurate. A third approach for the extraction of edge orientation from multi-channel images was to simply assigns the orientation estimate to the orientation computed from the band exhibiting the maximum magnitude response, as:

$$\phi_3 = \underset{\phi}{\operatorname{argmax}}(t_R, t_G, t_B). \qquad (15)$$

The test indicated that this method does not provide accurate orientation estimates. Overall, the tests indicated that the LVT provides a much better estimate of edge orientations as well as the edge magnitude response for multi-channel imagery, as compared to any of the three popular approaches implemented.

Having the ability to resolve edge orientations and magnitudes with a high degree of accuracy and reliability provides a better source of information applicable to road network tracking. In addition, as increasing volumes of high resolution satellite imagery become available, the extraction of major road networks from the imagery plays an important role in building geographic information systems going into the future. In recent years, many algorithms have been proposed to extract road networks from satellite imagery. Most of these algorithms, however, were developed to extract road networks from low resolution satellite imagery (10 meters to 20 meters per pixel) such as SPOT satellite imagery. As more and more high-resolution satellite images, such as IKONOS images (one meter per pixel), become available, future geographic information systems must support the exploitation of high resolution satellite imagery.

The extraction of road networks from high-resolution satellite images requires a very different methodology from that used to extract roads from low resolution satellite images. In low resolution satellite images, the width of roads typically ranges from one pixel to five pixels and extraction of road networks is equivalent to detection of edges, lines or detection of linear structures. However, with high-resolution images, the road-width can vary considerably, and additional variations are present such as lane markings, vehicles, shadows cast by buildings and trees, overpasses and changes in surface material. These variations make the extraction of road networks a much more complicated problem. The present invention has addressed this need by teaching a novel and efficient systems and method to extract road networks from high resolution satellite imagery. According to the teachings of the present invention, roads are represented by a set of features, or parameters, and each parameter is modeled as a random variable having a Gaussian distribution. To track a road, an initial starting point and direct on are specified by a human operator or provided by a road seed finding program. A road path is determined by tracking local road segments that are estimated from local paired line segments using a MAP (maximum a posteriori) estimator. In addition, some "post filtering" is applied to smooth the road boundaries and to remove any errors produced by the edge detection and road segmentation estimation process.

In high-resolution images roads possess certain inherent geometric characteristics, such as road width, curvature, and orientation that are clearly visible and thus detectable. To properly model these characteristics, it is important that a good representation of the roads is developed. According to an illustrative embodiment of the present invention, the following characteristics of roads are assumed:

Road width changes slowly.
Road orientation changes smoothly.
Since the surface material may change suddenly, the intensity values on the roads are likely to be constant or change abruptly.
The curvature of the road boundaries will also change smoothly.

Based on the above assumptions, a road path is modeled as a set of road segments, where each road segment is represented by a set of road features. Specifically, a road path r is represented by the union of a set of road segments $s_i$ as follows:

$$r = \{s_1, s_2, \ldots, s_n\} = \bigcup_{i=1}^{n} s_i \tag{16}$$

Each road segment $s_i$ is associated with a set of feature vectors $\{g_i, d_i, w_i, \theta_i\}$. The vector $g_i = g_i^1, g_i^2$ and $g_i^1$ and $g_i^2$ are the average intensity values at the two ends of $s_i$. The vector $d_i = (d_i^1, d_i^2$ and $d_i^1$ and $d_i^2$ are the orientation values at the two ends of $s_i$. The vector $w_i = (w_i^1, w_i^2)$ and $w_i^1$ and $w_i^2$ are the values of road width at the two ends of $s_i$.

Figure 6:
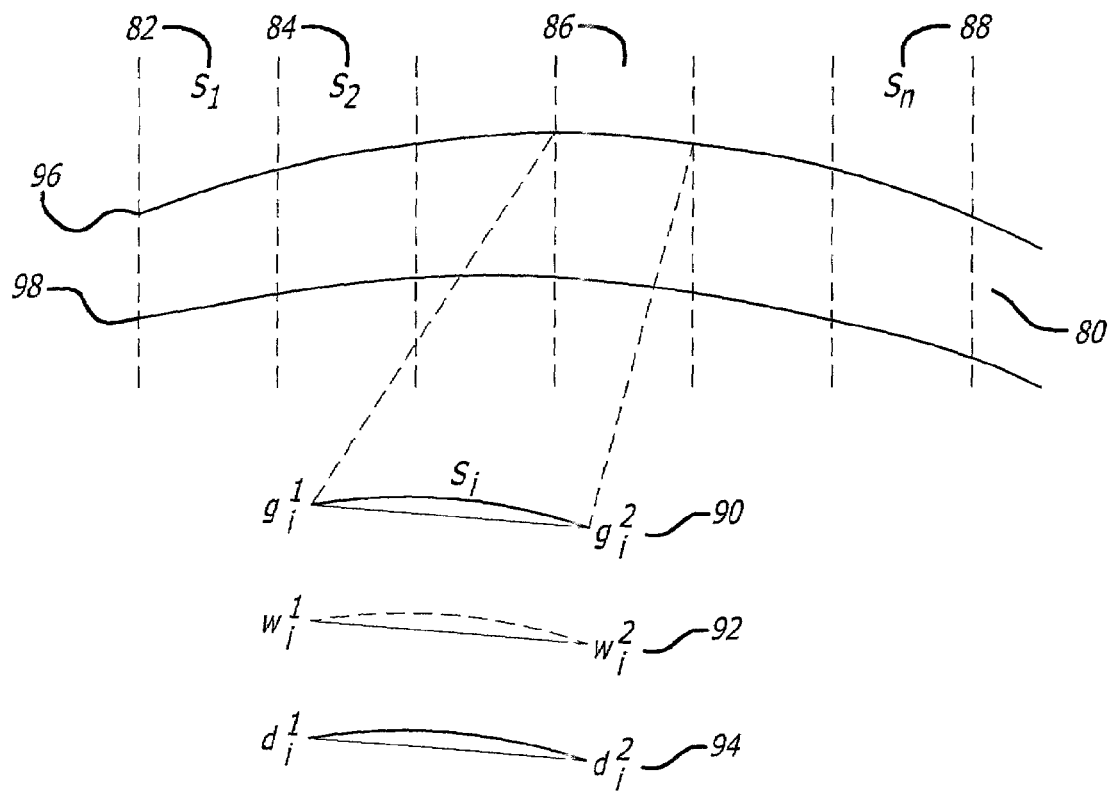
FIG. 6 is a road segmentation diagram according to an illustrative embodiment of the present invention.

Reference is directed to FIG. 6, which depicts a road path model using road segments described above. The road path 80 is divided into plural road segments, 82, 84, 86, 88 in the image segmentation process. The road path 80 is defined by two road edges 96 and 98. A single road segment 86 is further illustrated by its parameters for intensity 90, road width 92, and orientation 94. The centerline of $s_i$ is approximated by a parabola that is described by the following function with six parameters:

$$A_i x^2 + B_i xy + C_i y^2 + D_i x + E_i y + F_i = 0 \tag{17}$$

and $\theta_i = (A_i, B_i, C_i, D_i, E_i, F_i)$.

Every feature parameter is treated as an independent random variable having a Gaussian distribution.

Furthermore, the road path is modeled is a Markov process, thus the correlations are modeled that exist between $s_i$ and $s_{i+1}$. Since the road curvature is assumed to change smoothly, then:

$$\theta_{i+1} = 2\theta_i - \theta_{i-1} + \eta_\theta \tag{18}$$

where $\eta_\theta$ is a Gaussian noise source.

The intensity values on the roads may be constant or change abruptly, hence the average intensity is modeled as value vector $g_i$ as follows:

$$g_{i+1}^1 = g_i^2 + kI_i + \eta_g \tag{19}$$

where k is a constant, $\eta_g$ is a Gaussian noise source, and:

$$I_i = \begin{cases} 0 & \text{if } |g_i^2 - g_i^1| < \eta \\ 1 & \text{otherwise.} \end{cases} \tag{20}$$

The parameter $\eta$ is a threshold that is found empirically. The term Ii accounts for sudden changes in the intensity values of roads.

Both the road width and orientation are assumed to be constant for the most part, and if they do exhibit changes, it is assumed that the changes will be smooth. Therefore, a linear function is used to model their changes, and, the parameters are modeled using the following equations:

$$w_{i+1}^1 = 2w_i^2 - w_i^3 + \eta_w \tag{21}$$

$$d_{i+1}^1 = 2d_i^2 - d_i^1 + \eta_d \tag{22}$$

The terms $\eta_w$ and $\eta_d$ are Gaussian noise sources that are assumed to be independent of each other.

Now that the model has been developed, the next step in the process is to track a road path. In this process, a sequence of road segments is determined. Each road segment is determined from a set of candidates that are paired line segments. Since each road segment extends a road path locally, the paired line segments are extracted within a local image window, thereby making the present invention road tracking system more computationally efficient than the prior art methods that require global processing of the image in order to detect linear structures. According to the present invention system and method, the number of candidates for a new road segment will be greatly reduced within the local search window, as compared to the global approach.

The present invention system and method for extracting paired line segments can be described as follows. To extract line segments, edges are detected within the local window, and edge linking is performed using a range of orientations centered at the direction or orientation specified initially. Then, short line segments, and isolated edge points are removed, since major roads are not likely to be short in length. To compute the orientation of each line segment, a sub-window is applied to the two ends of each line segment. The edge orientation for every edge point inside the sub-window is computed, and two averaged orientations are obtained by averaging the orientations within the sub-window. The averaged orientations are used to represent the orientation of each line segment. To pair the line segments, all line segments are paired within the window if the following two conditions are met: (1) they have nearly the same length, and (2) they have approximately the same orientations. In order to handle curved roads, the system and method do not require that two line segments to be parallel to each other. To compute the road model parameters for each set of paired line segments, a center line is computed using a least square fitting technique, then the parameters of a parabola referenced from this center line is estimated. A sub-window is applied to both ends of the paired line segments, in order to compute the averaged road widths and averaged intensity values.

In the illustrative embodiment road tracking system, the problem of tracking a road path becomes one of determining a particular new road segment from the set of candidate paired line segments given a previously determined road segment. Applying the aforementioned road model, the distribution of new road segments is first estimated. Then, the paired line segments are found, which maximizes the probability of the new road segment. Mathematically, for each road segment $s_i$, let two random vectors $v_i^1$ and $v_i^2$ be associated with $s_i$ where:

$$v_i^1 = \{g_i^1, d_i^1, w_i^1, \theta_i^1\} \quad (23)$$

and $$v_i^2 = \{g_i^2, d_i^2, w_i^2, \theta_i^2\} \quad (24)$$

Let $C = \{c_1, c_2, \ldots, c_n\}$ be the set of paired line segments, which results in the vector $c_i = (c_i^1, c_i^2)$. The new road segment $s_i$ is determined by the following equation:

$$s_i = \operatorname*{argmax}_{c_i \in C} P_{v_i^1}(c_i^1). \quad (25)$$

To compute Equation (25), the distribution function $Pv_i^1$ must be estimated. Since it is assumed that the model parameters are independently Gaussian parameters, the distribution of $v_i^1$ is written as:

$$P_{v_i^1} = P_{g_i^1} P_{d_i^1} P_{w_i^1} P_{\theta_i^1} \quad (26)$$

where each distribution function in the right side of Equation (26) is a Gaussian function. Therefore, to estimate $Pv_i^1$ it is only necessary to estimate the mean value and the variance for each of the Gaussian functions in the right side of the Equation. (26). The values of the road parameters are obtained from previously tracked road segments to estimate the current mean values. Specifically, by modeling the correlations between $s_i$ and $s_{i+1}$, then:

$$\mu_{g_i^1} = g_{i-1}^2 + kI_{i\,1} \quad (27)$$

$$\mu_{d_i^1} = 2d_{i-1}^2 - d_{i-1}^1 \quad (28)$$

$$\mu_{w_i^1} = 2w_{i-1}^2 - w_{i-1}^1 \quad (29)$$

$$\mu_{\theta_i^1} = 2\theta_{i-1} - \theta_{i-2} \quad (30)$$

The variances can also be estimated using the data obtained from previous road segments. Since the parameters are assumed to vary smoothly, changes in the variances of the model parameters are most likely due to the Gaussian noise terms in the model, which are generally very small. Therefore, fixed variances can be used for the different model parameters.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for extracting a road in an image, comprising:
a first software module for extracting a plurality of line segments in said image;
a second software module for determining orientations of said line segments;
a third software module for pairing selected line segments based on said orientations, each line segment pair forming a candidate road segment; and
a fourth software module for selecting some of said candidate road segments to connect together to form a road;
a memory for storing said software modules; and a processor for executing said software modules.

2. The system of claim 1 wherein said image is a color image or a multi-spectral image.

3. The system of claim 1 wherein said fourth software module aggregates a plurality of filter responses.

4. The system of claim 1 wherein said third software module searches and pairs line segments that may represent road boundaries.

5. The system of claim 4 wherein said third software module searches and pairs line segments that have similar lengths and similar orientations.

6. The system of claim 5 wherein said second software module includes a fifth software module for computing an edge orientation for one or more points of said line segment.

7. The system of claim 6 wherein said second software module computes an averaged edge orientation at each end of each said line segment.

8. The system of claim 7 wherein said averaged edge orientation is computed by computing an edge orientation for each point inside a sub-window applied to an end of said line segment and means for averaging said edge orientations.

9. The system of claim 6 wherein said fifth software module for computing an edge orientation is adapted to receive a plurality of filter responses from a plurality of directional filters, a plurality of compass filters, a plurality of channels, or plural outputs of a finite impulse response filter.

10. The system of claim 9 wherein said fifth software module performs a line-to-vector transform on said filter responses such that said responses are mapped from a 1½D direction domain to a 2D vector domain.

11. The system of claim 10 wherein each filter response is transformed to a vector having a length equal to a magnitude of said response and an angle equal to twice the angle associated with said filter response.

12. The system of claim 10 wherein said fifth software module aggregates said transformed responses to provide an aggregated response.

13. The system of claim 12 wherein said fifth software module applies a fusing algorithm to aggregate said transformed responses from each of a plurality of spectral bands.

14. The system of claim 12 wherein said fifth software module halve a phase of said aggregated response to provide said edge orientation.

15. The system of claim 10 wherein said a line-to-vector transform maps from a 1½-D direction domain to a 2-D vector domain in such a way that perpendicular edge contrast becomes reciprocal.

16. The system of claim 1 wherein said fourth software module selects an initial road segment.

17. The system of claim 16 wherein said fourth software module selects a candidate road segment that maximizes a probability of said candidate segment being a next road segment given said initial segment.

18. The system of claim 17 wherein said fourth means software module selects additional candidate road segments that maximize the probability of each candidate segment being a next road segment given previously selected segments.

19. The system of claim 18 wherein said fourth means software module models said road as a set of road segments using a Markov process.

20. The system of claim 18 wherein said fourth software module represents each road segment by a set of road features.

21. The system of claim 20 wherein said fourth software module is adapted to:
estimate probability distributions of said features in said next road segment given a previously selected road segment;
compute a joint probability of said features for each of said candidate road segments; and
select a candidate road segment that maximizes said joint probability.

22. The system of claim 21 wherein said fourth software module computes values for each of said features for each of said candidate road segments.

23. The system of claim 22 wherein said fourth software module calculates a joint probability that said new road segment has features equal to said computed feature values for each of said candidate road segments.

24. The system of claim 23 wherein said joint probability is calculated by treating said road features as independent random variables, each having a Gaussian distribution.

25. The system of claim 24 wherein said fourth software module estimates a mean value of said Gaussian distribution for each feature from a value or values of said feature in a previously selected segment or segments.

26. The system of claim 25 wherein said fourth software module estimates a variance of said Gaussian distribution for each feature from a value or values of said feature in a previously selected segment or segments.

27. The system of claim 20 wherein said road features include road width, road orientation, road intensity and road curvature.

28. The system of claim 27 wherein road curvature is represented by a set of coefficients of a best-fit parabola to a centerline of said road segment.

29. The system of claim 27 wherein said fourth software module selects the candidate road segment that maximizes the joint probability $P_{v_i}^1 = P_{g_i}^1 P_{d_i}^1 P_{w_i}^1 P_{\theta_i}^1$, where $P_{g_i}^1$ is a distribution function of average road intensity at the beginning of the segment, $P_{d_i}^1$ is a distribution function of average road orientation at the beginning of the segment, $P_{w_i}^1$ is a distribution function of road width at the beginning of the segment, and $P_{\theta_i}^1$ is a distribution function of road curvature of the segment.

30. The system of claim 29 wherein said distribution function of road intensity $P_{g_i}^1$ is a Gaussian function having a mean $\mu_{g_i}^1 = g_{i-1}^2 + kI_{i-1}$, where $g_{i-1}^2$ is the road intensity at the end of road segment i−1, k is a constant, and $I_{i-1}$ is a step function dependent on a difference in intensity between the end and beginning of road segment i−1.

31. The system of claim 29 wherein said distribution function of road orientation $P_{d_i}^1$ is a Gaussian function having a mean $\mu_{d_i}^1 = 2d_{i-1}^2 - d_{i-1}^1$, where $d_{i-1}^2$ is the road orientation at the end of road segment i−1 and $d_{i-1}^1$ is the road orientation at the beginning of road segment i−1.

32. The system of claim 29 wherein said distribution function of road width $P_{w_i}^1$ is a Gaussian function having a mean $\mu_{w_i}^1 = 2w_{i-1}^2 - w_{i-1}$, where $w_{i-1}^2$ is the road width at the end of road segment i−1 and $w_{i-1}^1$ is the road width at the beginning of road segment i−1.

33. The system of claim 29 wherein said distribution function of road curvature $P_{\theta_i}^1$ is a Gaussian function having a mean $\mu_{\theta_i}^1 = 2\theta_{i-1} - \theta_{i-2}$, where $\theta_{i-1}$ is the road curvature of road segment i−1 and $\theta_{i-2}$ is the road curvature of road segment i−2.

34. The system of claim 1 wherein said first software module detects edge points in said image and means for linking selected edge points to form line segments.

35. A system of extracting a road path from an image, comprising:
a first software module for segmenting an image into at least a first window and a second window;
a second software module for identifying a first road segment within said first window
a third software module for extracting a plurality of line segments in said second window;
a fourth software module for determining orientations of said line segments;
a fifth software module for pairing selected line segments based on said orientations, each line segment pair forming a candidate mad segment;
a sixth software module for selecting a candidate road segment having a maximum probability of being a next road segment given said first road segment;
a memory for storing said software modules; and a processor for executing said software modules.

36. The system of claim 35 wherein said first software module selects groups of adjacent pixels in a digital image.

37. The system of claim 35 wherein said first window and said second window are adjacent to one another.

38. The system of claim 35 wherein said second software module is adapted to receive user input to the system identifying said first road segment.

39. The system of claim 35 wherein said second software module is adapted to automatically identify said first road segment by computer analysis.

40. The system of claim 35 wherein said sixth software module calculates said probability by modeling said road path as a Markovian process.

41. The system of claim 35 wherein said sixth software module computes values for a plurality of road features for each of said candidate road segments.

42. The system of claim 41 wherein said sixth software module is adapted to:
estimate probability distributions of said features in said next road segment given said first road segment;

compute a joint probability of said features for each of said candidate road segments; and select a candidate road segment that maximizes said joint probability.

43. The system of claim 35 further comprising a software module for connecting said first road segment and said selected candidate road segment into a road path.

44. The system of claim 43 further comprising a non-linear filter that operates to reduce road path estimation errors.

45. A system for extracting a road in an image, comprising:
a first software module for detecting a plurality of edge points in said image;
a second software module for linking selected edge points to form a plurality of line segments;
a third software module for computing a length and an orientation for each line segment;
a fourth software module for pairing line segments having similar lengths and orientations, each line segment pair forming a candidate road segment;
a fifth software module for identifying an initial road segment;
a sixth software module for selecting additional road segments from said candidate road segments, each selected road segment having a maximum probability of being a next road segment given a previously selected road segment;
a seventh software module for connecting said initial road segment and said selected road segments to form said road;
a memory for storing said software modules; and a a processor for executing said software modules.

46. The system of claim 45 wherein said third software module is adapted to compute said orientation for a line segment by:
receiving a plurality of filter responses for an edge point in said line segment;
transforming said filter responses using a line-to-vector transform;
aggregating said transformed filter responses to provide an aggregated response;
estimating an edge orientation of said edge point from said aggregated response;
estimating an edge orientation for a plurality of edge points in said line segment; and
averaging said edge orientation estimations to obtain an orientation of said line segment.

47. The system of claim 46 wherein said line-to-vector transform is adapted to map said filter responses from a 1-½D direction domain to a 2D vector domain.

48. The invention of claim 47 wherein said line-to-vector transform includes means for mapping from a 1½-D direction domain to a 2-D vector domain in such a way that perpendicular edge contrast becomes reciprocal.

49. A system for extracting a road in an image, comprising:
a first software module for extracting a plurality of line segments;
a second software module for determining orientations of said line segments;
a third software module for pairing selected line segments based on said orientations, each line segment pair forming a candidate road segment;
a fourth software module for selecting an initial road segment;
a fifth software module for representing a new road segment by a plurality of road features, wherein said road features are treated as independent random variables, each having a Gaussian distribution;
a sixth software module for estimating a mean and a variance of said Gaussian distribution for each feature from a value or values of said feature in a previously selected segment or segments;
a seventh software module for computing values for each of said features for each of said candidate road segments;
a eighth software module for calculating a joint probability that said new road segment has features equal to said computed feature values for each of said candidate road segments;
a ninth software module for selecting the candidate road segment that maximizes said probability;
a tenth software module for connecting said selected road segments to form said road;
a memory for storing said software modules; and a processor for executing said software modules.

* * * * *